United States Patent Office 3,345,311
Patented Oct. 3, 1967

3,345,311
CASTOR OIL, DIISOCYANATE AND HYDROXY ALIPHATIC ACID ESTER PREPOLYMERS AND ELASTOMERIC PRODUCTS PREPARED THEREFROM
Arthur Ehrlich, Brooklyn, N.Y., and Malcolm Kent Smith, Mountainside, and Temple C. Patton, Westfield, N.J., assignors to The Baker Castor Oil Company, Bayonne, N.J., a corporation of New Jersey
No Drawing. Filed Mar. 24, 1965, Ser. No. 442,507
22 Claims. (Cl. 260—18)

ABSTRACT OF THE DISCLOSURE

Urethane prepolymer compositions are described herein which comprise the reaction of castor oil, a diiocyanate and an ester of a hydroxy aliphatic acid wherein the ester and castor oil are present in a weight proportion of about 80% to 40% ester to about 20 to 60% castor oil, the prepolymers being cured with a polyfunctional compound to elastomers having good electrical and physical properties, particularly improved tensile strength and elongation properties, making the elastomers useful for potting and encapsulating electronic circuits, sonar equipment, etc.

This invention relates to novel urethane prepolymer compositions and to novel elastomeric products which are prepared from the prepolymers. More particularly, this invention relates to new and useful prepolymers obtained from the reaction product of castor oil, a diisocyanate and an ester of a hydroxy aliphatic acid of at least twelve carbon atoms and the cured elastomeric products obtained from the novel prepolymers.

The reaction of diisocyanates with polyfunctional compounds containing active hydrogen to produce urethane polymers is well known. In the commerical application of urethane polymers it has been found advantageous to use castor oil as the polyfunctional compound containing active-hydrogen groups. These urethane polymers prepared from castor oil and diisocyanates have found many uses, including rigid and semi-rigid foams, flexible foams, solid plastics, elastomers, protective coatings and adhesives.

The heretofore known prepolymers prepared from the reaction of castor oil and a diisocyanate, with or without modifiers and additives, are subjected to certain disadvantages which detract from their more general application. For example, those heretofore utilized prepolymers exhibit low tensile strength and elongation when further reacted with products containing active-hydrogen groups. Such low tensile strength and elongation are a serious disadvantage when the product is used as an adhesive, coating or encapsulant, since upon continued handling it tends to break, flake off or be pulled away from the substrate. Another disadvantage frequently present in the heretofore utilized prepolymers is excessive shrinking upon being cured.

One aspect of the present invention is to provide an elastomeric product having good electrical properties as determined by the dielectric constant and dissipation factor, good physical properties such as resistance to the effects of moisture, low moisture absorption and markedly improved tensile and elongation properties, so as to make the product more resistant to handling and to improve resistance to shrinking on conversion of the prepolymer to a cured product.

Another aspect of this invention is to provide a prepolymer composition which comprises the reaction product of castor oil, a diisocyanate and an ester of a hydroxy aliphatic acid, wherein the weight proportion of the castor oil to the hydroxy aliphatic acid ester is maintained within specified ranges.

A still further aspect of this invention is to provide elastomeric materials by curing the novel prepolymers with compounds containing active-hydrogen groups.

Still another aspect of this invention is directed to effecting a reduction in the so-called "bubbling" when the elastomeric materials are cast.

The foregoing aspects of this invention as well as others will become apparent as the description proceeds.

Basically, the prepolymers of the present invention comprise the reaction product of castor oil, a glycol or a polyglycol monoester of a hydroxy aliphatic acid of at least 12 carbon atoms and an organic diisocyanate.

The castor oil may be any commerical grade of castor oil. The preferred grade is a low acid, low volatile grade available commerically as a DB grade of castor oil, obtained from The Baker Castor Oil Company. Low acid value and moisture content are important considerations in the preparation of the urethanes of this invention, since both water and carboxylic acid react with isocyanates to form $CO_2$, and lead to complex reaction products. Thus, the low moisture and acid content of the selected castor oil result in minimum side reactions with isocyanates, thereby keeping prepolymer viscosities low and largely eliminating the possibility of gelation. Another advantage from the use of the selected castor oil is that it results in minimum foams, thereby permitting efficient use of the full capacity of the reaction kettle without costly spillover.

In the formation of the prepolymers, any organic polyisocyanate may be used which is known in the art to be useful in the preparation of urethane prepolymers. However, arylene diisocyanates as represented by the diisocyanates of the benzene and napthalene series, or mixtures of these compounds, are preferred. Illustrative of arylene diisocyanates that may be employed are the following: tolylene diisocyanate (2,4/2,6), toluene 2,4 diisocyanate, toluene 2,6 diisocyanate, m-phenylene diisocyanate, xenylene 4,4' diisocyanate, napthalene 1,5 diiosocyanate, 3,3' bitolylene 4,4' diisocyanate, diphenylene 4,4' diisocyanate and 1-chlorophenylene 2,4 diisocyanate, diphenylene ether 4,4' diisocyanate, diphenylene methane 4,4' diisocyanate.

Other arylene diisocyanates which are useful include lower alkyl substituted derivatives, halo substituted derivates, and also alkoxy substituted derivatives. Other aromatic hydrocarbon diisocyanates as well as aliphatic polyisocyanates may be used, but the latter are not as reactive as aromatic diisocyanates.

The glycol and polyglycol monoesters of hydroxy aliphatic acids of at least 12 carbon atoms are prepared by reacting a hydroxy carboxylic acid of at least 12 carbon atoms with dihydric lower aliphatic alcohols or ether alcohols, such as ethylene glycol, propylene glycol, hexylene glycol, diethylene glycol, dipropylene glycol, hexamethyene glycol, and polyethylene and polypropylene glycols, according to procedures well known in the prior art such as direct esterification.

The hydroxy carboxylic acids may be saturated or unsaturated. Illustrative of this class of hydroxy acids are the following: ricinoleic acid, 12-hydroxy stearic acid, hydroxy palmitic acid, hydroxy pentadecanoic acid, hydroxy myristic acid, hydroxy docosanoic acid, hydroxy cerotic acid, etc. The length of the carbon chain of the hydroxy carboxylic acids is limited only to the extent that commercially there are available carboxylic acids having about twenty-two carbon atoms. However, hydroxy carboxylic acids having more than twenty-two carbon atoms are also contemplated.

The preferred esters used in the preparation of the prepolymers of the present invention are propylene glycol monoricinoleate, ethylene glycol monoricinoleate, and propylene glycol 12-hydroxy stearate. Among the other esters which are useful in the preparation of the prepolymers include diethylene glycol monoricinoleate, polyethylene glycol monoricinoleate, dipropylene glycol monoricinoleate, polypropylene glycol 12-hydroxy stearate, propylene glycol hydroxy palmitate, etc.

In describing the general preparation of the prepolymers of this invention, reference will be made to the use of propylene glycol monoricinoleate which is the preferred compound to be reacted with the castor oil and an arylene diisocyanate.

The prepolymer is prepared by combining DB castor oil, propylene glycol monoricinoleate and an arylene diisocyanate. This mixture should be heated for one hour at 50° C. However, other temperatures from about 20° C. to 100° C. may be satisfactorily employed. It has been found that if the mixture is heated at temperatures as high as 130° C. and above, the viscosity of the prepolymer is so high that it cannot be handled readily.

The propylene glycol monoricinoleate may be any such commercial product as Flexricin 9, available from The Baker Castor Oil Company. It has been found that better products are obtained if the commercial grade is treated to reduce the soap content to below .1% and dried to below .1% volatility, and if the product used has a hydroxy value of 290±3. Products with a wider range of hydroxyl value, say 290±20, and also higher soap and moisture content can be used, but the preparation becomes increasingly difficult to handle.

A further highly advantageous result obtained from combining propylene glycol monoricinoleate and castor oil according to the invention is the markedly reduced so-called "bubbling" when the elastomers are cast. The reaction product of commercial propylene glycol monoricinoleate and tolylene diisocyanate bubbles badly when cured with compounds containing active-hydrogen groups, because of the carbon dioxide obtained in the reaction product. However, when the propylene glycol monoricinoleate is combined with castor oil, this so-called "bubbling" is reduced, and by limiting the presence of soap and moisture normally found in commercial propylene glycol monoricinoleate to below .1% respectively, further reduction in bubbling is accomplished.

The esters of the hydroxy carboxylic acids of at least 12 carbon atoms are used in a weight proportion with castor oil of about 80 to 40% of the ester to 20 to 60% castor oil, the preferred proportion being 61 to 63% of the ester to 39 to 37% castor oil. These proportions are a highly important aspect of this invention. If the weight of the castor oil is substantially above 60% by weight based on the weight of the ester, compositions are obtained which exhibit substantial shrinking on curing and do not result in improved tensile and elongation properties. Therefore, it is important in the preparation of the prepolymers of this invention that the range of proportions set forth above be employed.

It has also been found that about 2 to 3 NCO equivalents of the organic diisocyanate per equivalent of hydroxyl group in the mixture of castor oil and the ester provides a useful range of products.

The ingredients used to prepare the prepolymer may be simply mixed together in any sequence. In practice, it is preferred that the castor oil be premixed with the ester of the hydroxy carboxylic acid prior to reaction with the organic diisocyanate.

The reaction product of castor oil, the ester of a hydroxy carboxylic acid of at least 12 carbon atoms and an arylene diisocyanate result in a prepolymer which is a thick syrupy liquid. The prepolymer obtained is reacted with chemicals, including polymeric materials, containing two or more active-hydrogen groups to produce elastomeric materials which have utility as floccing adhesives, paper coatings, potting compositions, and encapsulation compounds for electronic parts. By the term "active-hydrogen" is meant those hydrogen atoms which are reactive as measured and determined by the Zerewitinoff method. Among the typical compounds containing active-hydrogen groups which will react with the prepolymers are alcohols, amines, glycol monoesters of carboxylic acids, polyesters, polyester amides and polyalkylene glycols. The amount of compound added with active-hydrogen should be sufficient to react with the free isocyanate groups remaining after the preparation of the prepolymer, but preferably not in too low an amount or too much is excess. Too low an amount of such curing agent tends to render the elastomeric material too hard and increases the cost of the product. An excess of the curing component causes it to act as a plasticizer, and this in frequently undesirable. The amount of curing agent required to react properly with the prepolymer can be determined by the following calculation:

Parts of curing agent for 100 parts of prepolymer $$= \frac{1,335 \times \text{percent NCO (isocyanate) of prepolymer}}{\text{Hydroxyl value} + \text{acid number of curing agent}}$$

Among the alcohols which are useful for curing the prepolymers of this invention are dihydric and ether alcohols, preferably aliphatic alcohols. Illustrative of these alcohols are the following: propylene glycol, ethylene glycol, hexylene glycol, dipropylene glycol, hexamethylene glycol, butanediol-1,3 as well as other dihydric and polyether alcohols having active hydrogens. Further, polyalkylene ether glycols are useful such as polyethylene and polypropylene glycol of varying molecular weight. The monoesters which may be employed are glycol and polyglycol esters of saturated and unsaturated carboxylic acids containing up to three hydroxyl groups per molecule. Illustrative examples of these free esters are the following: ethylene glycol monoricinoleate, propylene glycol monoricinoleate, glycerol monoricinoleate, diethylene glycol monostearate and polypropylene glycol monoricinoleate.

Among the polyesters which may be employed are those obtained from the reaction of any dibasic carboxylic acid containing at least 3 carbon atoms with dihydric alcohols and ether alcohols. Illustrative of these acids are the following: succinic, glutaric, adipic, pimelic, malonic, fumaric, etc. Any glycol may be used in the formation of the polyesters including ethylene glycol, propylene glycol, pentamethylene glycol, etc. The polyester amides can be prepared by the reaction of any dibasic carboxylic acid containing at least 3 carbon atoms with an amino alcohol or diamine. Examples of amino alcohols that may be employed include ethanolamine, 3-amino propanol, 6-amino hexanol, etc. Diamines include ethylene diamine, propylene diamine, 1,4-hexamethylene diamine, etc. Further, castor oil and its derivatives may also be employed as a curing agent for the prepolymers of this invention.

The amines that are useful for curing the prepolymers are those having active-hydrogens such as primary and secondary organic diamines. Included are aliphatic, cyclic, aromatic, aralkyl and alkaryl diamines. Illustrative of some of these diamines which fall within the scope of this invention are the following: laurylguanamine, 4,4'-methylene-bis-(2-chloroaniline), 3,3'-dichloro-4,4'-diamino-diphenylmethane, 3,3'-dichlorobenzidine, ethylene diamine, diethylene triamine, 4,4'-diamino biphenyl, phenethyl diamine. Other polyols not enumerated above are equally effective for curing the prepolymers as long as they meet the requirement of having active-hydrogen groups for reaction with the free isocyanate groups.

It is frequently useful to add a non-reactive ingredient to the elastomeric product as a part of the final step to change the physical properties, reduce cost and/or plasticize the elastomer. The following materials have been found to be useful for this purpose, but should not be considered as a complete list of such compounds: chlorinated biphenyls and polyphenyls, hydroxylated rosin, dioctyl phthalate, diisooctylphthalate, dioctyl sebacate, acetylated glyceride of 12-hydroxystearic acid and fillers such as calcium carbonate and silica.

The step of converting the prepolymer, with a curing agent, to an elastomeric product may be carried out at room temperature, or elevated temperature (e.g., 50° C. to 150° C.). If it is desired to carry out the reaction at room temperature, it is expedient to add a catalyst to speed up the reaction. Suitable catalysts are various organic amines such as dimethylaminoethanol, triethylene diamine, triethyl amine, tetramethyl butanediamine, or tin salts such as stannous octoate or dibutyl tin dilaurate.

PREPARATION OF PREPOLYMERS

Procedure #1

The prepolymer is formed in a vessel by slowly adding an arylene diisocyanate to a castor oil/ester mixture with stirring, heating to about 25–80° C. for about one hour and then cooling to room temperature. During this heating, it is essential that the reaction mixture be protected from atmospheric moisture. This absence of moisture may be accomplished either by use of a drying agent at the exit of the vessel or by maintaining a moisture-free atmosphere of a dry inert gas, e.g. nitrogen.

Procedure #2

The prepolymer may also be formed by slowly adding the castor oil/ester mixture to the arylene diisocyanate, heating to about 25–80° C. for about one hour, and then cooling to room temperature.

Procedure #3

The prepolymer may also be formed using Procedures 1 and/or 2 by reacting stepwise the castor oil and arylene diisocyanate and the ester and then combining these reaction products in the correct proportions.

The following examples illustrate the preparation of the prepolymer:

EXAMPLE 1

Charge 2,630 pounds of tolylene diisocyanate (2,4/2,6 of 80/20 proportion by weight) of the high or low acidity type (acidity of 0.010–0.015% preferred) to the reactor. Prepare a blend of 1,035 pounds of DB castor oil and 1,665 pounds of propylene glycol monoricinoleate (grades previously described). Approximately 880 pounds of the blend of castor oil-propylene glycol monoricinoleate is added in 20 minutes and allow to react. By resorting to cooling, the temperature of the reaction mass is allowed to rise only to 35° C. If it goes higher, discontinue reaction until it drops to 35° C. before continuing the addition. Add another 880 pounds of the blend in 20 minutes. The maximum temperature now should be about 43° C. If higher, wait until it subsides to 43° C. Add the balance of the blend in about 20 minutes. Allow the temperature to rise and shut off cooling at 45° C. However, do not allow the temperature to rise about 50° C. If necessary, cool or heat the material to 50° C. and maintain that temperature for 1½ hours. Discharge and package the prepolymer.

The prepolymer has the following approximate properties: Viscosity (Fenske)=127 stokes; specific gravity at 25° C.=1.111; percent NCO=14.4±.4; color=Gardner 4.

EXAMPLE 2

Following Procedure 1 outlined above a prepolymer was prepared based on the reaction of the following:

| | Parts by wt. |
|---|---|
| Ethylene glycol monoricinoleate (Flexricin 15) | 62.0 |
| DB castor oil | 38.0 |
| Tolylene diisocyanate (2,4/2,6 of 80/20 by weight) | 90.4 |

This prepolymer has the following approximate properties: Viscosity (Fenske)=390 stokes; specific gravity at 25° C.=1.108; percent NCO=13.7±1; color=light amber.

PREPARATION OF ELASTOMERIC MATERIAL

Procedure for room temperature cure

A suitable catalyst is mixed with the curing agent. Then the prepolymer and the curing agent containing the catalyst are mixed in the correct proportions until homogeneous. The mixture is then degassed from one to three minutes at 5 to 10 mm. mercury pressure. The degassed mixture is then poured into molds and cured at room temperature.

Procedure for the heat cure

The prepolymer and curing agent are first placed separately in a vacuum oven and degassed at 50–60° C. for 10 to 30 minutes at 5 mm. mercury pressure or at least until the foam, which initially appears, collapses. At the end of the designated period, the vacuum is broken and the correct amount of curing agent is added to the preparation to effect the cure. After thoroughly mixing the reactants until homogeneous the prepolymer/curing agent mixture is re-evacuated at 60° C. for 2 to 3 minutes at 5 mm. mercury pressure to remove air introduced during the mixing. The degassed mixture is then poured into molds and cured for about 4 hours at 100° C. The curing can also be initially commenced at a lower temperature such as 80° C. for the first 2 hours and the temperature is then raised to about 100° for the next 2 hours. The curing rate can be accelerated by increasing the temperature.

To determine the markedly improved tensile strength of the elastomeric products of this invention, a control castor oil/tolylene diisocyanate prepolymer, typical of the prepolymers heretofore known in the art, containing 62 parts of castor oil and 38 parts of tolylene diisocyanate, was prepared according to Example 1 above, using a typical commercially available castor oil such as DB castor oil.

Examples 3 through 8 below are illustrative of the heat cured elastomeric products prepared using the same curing procedure, which is as follows:

The prepolymer and curing agent are placed separately in a vacuum oven and degassed at 60° C. for 30 minutes at 5 mm. mercury pressure. At the end of this period the vacuum is broken and the correct amount of curing agent, as set forth in each example, is added to the prepolymer to effect the cure. After thoroughly mixing the reactant until homogeneous, the mixture is re-evacuated at 60° C. for 3 minutes at 5 mm. mercury pressure to remove air introduced during the mixing. The degassed mixture is then poured into open molds and cured for 2 hours at about 80° C. and for an additional 2 hours at about 100° C. This same procedure was also employed for the preparation of the elastomeric products obtained from the control prepolymer. The physical properties of the elastomeric products of these examples were obtained from ⅛ inch slabs, aged at least 7 days at room temperature. The data obtained are shown in the following examples, wherein the curing agent is indicated in each instance.

EXAMPLE 3

| | Parts by Weight | |
|---|---|---|
| Control Prepolymer | 100 | |
| Prepolymer Example 1 | | 100 |
| DB Castor Oil | 86.6 | 119 |
| NCO/OH Ratio | 1/1 | 1/1 |
| Tensile Strength, p.s.i. | 195 | 235 |
| Elongation at Break, percent | 75 | 125 |

EXAMPLE 4

| | Parts by Weight | |
|---|---|---|
| Control Prepolymer | 100 | |
| Prepolymer Example 1 | | 100 |
| Propylene Glycol Monoricinoleate | 48.7 | 66.6 |
| NCO/OH Ratio | 1/1 | 1/1 |
| Tensile Strength, p.s.i. | 300 | 875 |
| Elongation at Break, percent | 210 | 400 |

EXAMPLE 5

| | Parts by Weight | |
|---|---|---|
| Control Prepolymer | 100 | |
| Prepolymer Example 1 | | 100 |
| Glycerol Monoricinoleate | 41.3 | 56.3 |
| NCO/OH Ratio | 1/1 | 1/1 |
| Tensile Strength, p.s.i. | 1275 | 2380 |
| Elongation at Break, percent | 180 | 170 |

EXAMPLE 6

| | Parts by Weight | |
|---|---|---|
| Control Prepolymer | 100 | |
| Prepolymer Example 1 | | 100 |
| Ethylene Glycol Monoricinoleate | 53.8 | 73.9 |
| NCO/OH Ratio | 1/1 | 1/1 |
| Tensile Strength, p.s.i. | 320 | 1050 |
| Elongation at Break, percent | 140 | 270 |

EXAMPLE 7

| | Parts by Weight | |
|---|---|---|
| Control Prepolymer | 100 | |
| Prepolymer Example 1 | | 100 |
| DB Castor Oil | 8.6 | 11.8 |
| Dipropylene Glycol | 19.5 | 26.9 |
| Dioctyl Sebacate | 16.1 | 22.2 |
| NCO/OH Ratio | 1/1 | 1/1 |
| Tensile Strength, p.s.i. | 735 | 915 |
| Elongation at Break, percent | 270 | 300 |

EXAMPLE 8

| | Parts by Weight | |
|---|---|---|
| Control Prepolymer | 100 | |
| Prepolymer Example 2 | | 100 |
| Propylene Glycol Monoricinoleate | 48.7 | 61.3 |
| NCO/OH Ratio | 1/1 | 1/1 |
| Tensile Strength, p.s.i. | 300 | 925 |
| Elongation at Break, percent | 210 | 330 |

The examples cited above show the improvement in tensile strength which is imparted by using the prepolymer of Examples 1 and 2 over the control prepolymer in the preparation of elastomeric products.

The novel elastomeric products of Examples 3 through 8 are particularly useful in potting and encapsulating electronic circuits. They are also all useful in coating systems. The product of Example 5 is also useful as a floccing adhesive. The product of Example 7 is also useful for potting underseas sonar equipment.

While the examples cited herein are exemplary of the invention, it is to be understood that other modifications are within the skill of the art. The scope of the invention is defined by reference to the claims.

What is claimed is:

1. A non-foamed prepolymer composition consisting essentially of the reaction product obtained from castor oil, an ester of a hydroxy carboxylic acid of at least 12 carbon atoms, said ester being selected from the class consisting of a glycol ester of said hydroxy carboxylic acid and a polyglycol ester of said hydroxy carboxylic acid, and an arylene diisocyanate which comprises reacting from about 2 to about 3 NCO equivalents of an arylene diisocyanate per equivalent of hydroxy group in the mixture of castor oil and ester, wherein said ester and castor oil are used in a weight proportion of about 63% to 61% of said ester to 39% to 37% of castor oil and wherein the reaction of the castor oil, ester and diisocyanate is carried out at a temperature from about 20° to 100° C.

2. A non-foamed prepolymer composition according to claim 1 wherein the ester is a lower alkyl glycol ester of a hydroxy carboxylic acid of at least 12 carbon atoms.

3. A non-foamed prepolymer composition according to claim 2, wherein the ester is the propylene glycol ester of a hydroxy carboxylic acid of at least 12 carbon atoms.

4. A non-foamed prepolymer composition according to claim 3 wherein the ester is propylene glycol monoricinoleate.

5. A non-foamed prepolymer composition according to claim 1 wherein the arylene diisocyanate is selected from the class consisting of tolylene diisocyanate, toluene 2,4 diisocyanate, toluene 2,6 diisocyanate, m-phenylene diisocyanate, xenylene 4,4' diisocyanate, naphthalene 1,5' diisocyanate, 3,3' bitolylene 4,4' diisocyanate, diphenylene 4,4' diisocyanate, 1-chlorophenylene 2,4 diisocyanate, diphenylene ether 4,4' diisocyanate and diphenylene methane 4,4' diisocyanate.

6. A non-foamed prepolymer composition according to claim 1 wherein the hydroxy carboxylic acid is ricinoleic acid.

7. A non-foamed prepolymer composition consisting essentially of the reaction product obtained from castor oil, a lower alkyl glycol ester of a hydroxy carboxylic acid of at least 12 carbon atoms and tolylene diisocyanate, which comprises reacting from about 2 to about 3 NCO equivalents of the diisocyanate per equivalent of hydroxyl group in the mixture of castor oil and ester, wherein said ester and castor oil are used in a weight proportion of about 61 to 63% of said ester to 39 to 37% of castor oil and wherein said reaction of the castor oil, ester and diisocyanate is carried out at a temperature of about 50° C.

8. A non-foamed prepolymer composition according to claim 7 wherein the ester is the propylene glycol ester of a hydroxy carboxylic acid of at least 12 carbon atoms.

9. A non-foamed prepolymer composition according to claim 8 wherein the ester is propylene glycol monoricinoleate.

10. A non-foamed prepolymer composition according to claim 7 wherein the hydroxy carboxylic acid is ricinoleic acid.

11. A non-foamed prepolymer composition consisting essentially of the reaction product obtained from castor oil, a lower alkyl glycol ester of ricinoleic acid and tolylene diisocyanate which comprises reacting from about 2 to about 3 NCO equivalents of the diisocyanate per equivalent of hydroxyl group in the mixture of castor oil and ester wherein said ester and castor oil are used in the weight proportion of about 62% of the ester to about 38% castor oil, and wherein the reaction of the castor oil, ester and diisocyanate is carried out at a temperature of about 50° C.

12. A non-foamed elastomeric product consisting essentially of the cured reaction product of (1) the product of the reaction of castor oil, a lower alkyl glycol ester of a hydroxy carboxylic acid of at least 12 carbon atoms and an arylene diisocyanate, which comprises reacting from about 2 to 3 NCO equivalents of the diisocyanate per equivalent of hydroxy group in the mixture of castor oil and ester, wherein hte ester and castor oil are used in a weight proportion of about 80% to 40% of the ester to about 20% to 60% castor oil, said reaction of castor oil, ester and diisocyanate being carried out at a temperature of from about 20° C. to 100° C. and (2) a curing agent consisting essentially of at least one member selected from the class consisting of a castor oil, an alcohol, an amine, a polyester, a polyester amide, a polyalkylene glycol and a polyhydric alcohol ester of a carboxylic acid, said ester containing up to three free hydroxyl groups per molecule and said curing agent being added after the prepolymer defined in (1) is obtained.

13. A non-foamed elastomeric product according to claim 12 wherein the ester is the lower alkyl glycol ester of ricinoleic acid.

14. A non-foamed elastomeric product according to claim 13 wherein the ester is propylene glycol monoricinoleate.

15. A non-foamed elastomeric product according to claim 13 wherein the curing agent is castor oil.

16. A non-foamed elastomeric product according to claim 22 wherein said polyhydric alcohol ester of a carboxylic acid is propylene glycol monoricinoleate.

17. A non-foamed elastomeric product according to claim 22 wherein said polyhydric alcohol ester of a carboxylic acid is glycerol monoricinoleate.

18. A non-foamed elastomeric product consisting essentially of the cured reaction product of (1) about 100 parts by weight of the product of the reaction of castor oil, propylene glycol monoricinoleate and tolylene diisocyanate, which comprises reacting from about 2 to 3 NCO equivalents of the diisocyanate per equivalent of the hydroxy group in the mixture of castor oil and ester, wherein said ester and castor oil are used in a weight proportion of about 61 to 63% of the ester to 39 to 37% castor oil, said reaction of castor oil, ester and diisocyanate being carried out at a temperature of about 50° C. and (2) a curing agent consisting essentially of about 119 parts by weight of castor oil said curing agent being added after the prepolymer defined in (1) is obtained.

19. A non-foamed elastomeric product consisting essentially of the cured reaction product of (1) about 100 parts by weight of the product of the reaction of castor oil, propylene glycol monoricinoleate and tolylene diisocyanate, which comprises reacting from about 2 to 3 NCO equivalents of the diisocyanate per equivalent of the hydroxy group in the mixture of castor oil and ester, wherein said ester and castor oil are used in weight proportion of about 61 to 63% of the ester to 39 to 37% castor oil, said reaction of castor oil, ester and diisocyanate being carried out at a temperature of about 50° C. and (2) a curing agent consisting essentially of about 66.6 parts by weight of propylene glycol monoricinoleate said curing agent being added after the prepolymer defined in (1) is obtained.

20. A non-foamed elastomeric product consisting essentially of the cured reaction product of (1) about 100 parts by weight of the product of the reaction of castor oil, propylene glycol monoricinoleate and tolylene diisocyanate, which comprises reacting from about 2 to 3 NCO equivalents of the diisocyanate per equivalent of the hydroxy group in the mixture of castor oil and ester, wherein said ester and castor oil are used in a weight proportion of about 61 to 63% of the ester to 39 to 37% castor oil, said reaction of castor oil, ester and diisocyanate being carried out at a temperature of about 50° C. and (2) a curing agent consisting essentially of about 56.3 parts by weight of glycerol monoricinoleate said curing agent being added after the prepolymer defined in (1) is obtained.

21. An elastomeric product comprising the cured reaction product of (1) about 100 parts by weight of the product of the reaction of castor oil, propylene glycol monoricinoleate and tolylene diisocyanate which comprises reacting from about 2 to 3 NCO equivalents of the diisocyanate per equivalent of the hydroxy group in the mixture of castor oil and ester, wherein said ester and castor oil are used in a weight proportion of about 61 to 63% of the ester to 39 to 37% castor oil, said reaction of castor oil, ester and diisocyanate being carried out at a temperature of about 50° C. and (2) a curing agent comprising a mixture of about 11.8 parts by weight of castor oil, about 26.9 parts by weight of dipropylene glycol, and (3) about 21.2 parts by weight of dioctyl sebacate said curing agent being added after the prepolymer defined in (1) is obtained.

22. A non-foamed elastomeric product according to claim 12 wherein the curing agent is a polyhydric alcohol ester of a carboxylic acid, said ester containing up to three free hydroxyl groups per molecule.

References Cited

UNITED STATES PATENTS

| | | | |
|---|---|---|---|
| 2,772,245 | 11/1956 | Simon | 106—18 |
| 2,994,674 | 8/1961 | Rudkin. | |
| 3,001,958 | 9/1961 | Schwarcman | 260—18 |
| 3,037,947 | 6/1962 | Elkin | 260—18 |

OTHER REFERENCES

Patton, Rubber Age, vol. 86, No. 4, January 1960, pp. 639–644.

JULIUS FROME, *Primary Examiner.*